US006341782B1

(12) United States Patent
Etsion

(10) Patent No.: US 6,341,782 B1
(45) Date of Patent: Jan. 29, 2002

(54) LUBRICATED SEALS HAVING MICROPORES

(75) Inventor: Izhak Etsion, Haifa (IL)

(73) Assignee: Surface Technologies LTD, Nesher (IL)

( * ) Notice: Subject to any disclaimer, the term of this patent is extended or adjusted under 35 U.S.C. 154(b) by 0 days.

(21) Appl. No.: 09/518,237

(22) Filed: Mar. 3, 2000

(51) Int. Cl.$^7$ .............................. F16J 9/12; F16J 15/34
(52) U.S. Cl. ..................... 277/399; 277/400; 277/459
(58) Field of Search ........................... 277/400, 459, 277/399, 464, 465

(56) References Cited

U.S. PATENT DOCUMENTS

| | | | |
|---|---|---|---|
| 3,109,658 A | * | 11/1963 | Barrett et al. |
| 3,554,568 A | * | 1/1971 | Heid, Jr. |
| 3,638,957 A | * | 2/1972 | Marsi |
| 3,917,289 A | * | 11/1975 | Ivanov et al. |
| 4,420,163 A | * | 12/1983 | Takenaka et al. |
| 4,523,764 A | * | 6/1985 | Albers et al. |
| 5,180,173 A | * | 1/1993 | Kimura et al. |
| 5,224,714 A | * | 7/1993 | Kimura et al. |
| 5,834,094 A | * | 11/1998 | Etsion et al. |
| 5,952,080 A | * | 9/1999 | Etsion et al. |
| 6,189,896 B1 | * | 2/2001 | Dickey et al. |

OTHER PUBLICATIONS

I. Etsion and L. Burstein, "A Model for Mechanical Seals with Regular Microsurface Structure", ATLE/ASME Conf. 10/95.*

* cited by examiner

*Primary Examiner*—Anthony Knight
*Assistant Examiner*—John L. Beres
(74) *Attorney, Agent, or Firm*—Mark M. Friedman

(57) ABSTRACT

A lubricated hydrostatic seal comprising (a) surface regions having opposing surfaces; (b) a plurality of micropores in one or more of said surfaces having a pore geometry; and (c) a flow of fluid between said surfaces, wherein said flow of fluid past said micropores provides a lifting force between said surfaces. In a preferred embodiment, the opposing surfaces of the surface regions are nominally parallel. Nominally-parallel surfaces are simple to manufacture and are considerably less expensive than the various converging-surface configurations of the prior art. The nominally-parallel surface configuration can also be utilized in both liquid-lubricated and gas-lubricated hydrodynamic seal applications, and in hybrid-seal applications in which both hydrodynamic and hydrostatic lift are generated.

42 Claims, 7 Drawing Sheets

PRIOR ART

PRIOR ART

LUBRICATED SEALS HAVING MICROPORES

FIELD AND BACKGROUND OF THE INVENTION

The present invention relates to seals with improved frictional behavior and, more particularly, to a seal having a load-bearing surface whose load-carrying capacity is improved by the presence of micropores.

It is well known from the theory of hydrodynamic lubrication that when two parallel surfaces, separated by a lubricating film, slide at some relative speed with respect to each other, no hydrodynamic pressure, and hence no separating force, can be generated in the lubricating film. The mechanism for hydrodynamic pressure buildup requires a converging film thickness in the direction of sliding. In conventional applications, this often is obtained by some form of misalignment or eccentricity between the sliding surfaces, for example, hydrodynamic thrust and journal bearings.

For liquid lubricants, the macrosurface structure, particularly in the form of waviness on the sliding surfaces, has been studied in the past for both parallel face thrust bearings and mechanical seals. The load carrying capacity in these cases is due to an asymmetric hydrodynamic pressure distribution over the wavy surface. The pressure increase in the converging film regions is much larger than the pressure drop in the diverging film regions. This is because the pressure drop is bounded from below by cavitation, whereas the pressure increase has effectively no upper limit. Microsurface structure in the form of protruding microasperities on the sliding surfaces also can be used to generate a locally asymmetric pressure distribution with local cavitation. The integrated effect of these microasperities can be useful in producing separating force between parallel sliding surfaces. Asymmetric pressure distribution also can be obtained by depressed surface structures, and various forms of grooves are used in bearings and mechanical seals. See, for example, T. W. Lai, "Development of Non-Contacting, Non-Leaking Spiral Groove Liquid Face Seals, Lubr. Eng., vol. 50, pp. 625–640 (1994).

U.S. Pat. No. 5,952,080 to Etsion et al. discloses a method for designing bearings, of improved performance, the load-bearing surfaces of which feature micropores. The hydrodynamic pressure distribution of a suite of bearing surfaces with different micropore geometries and densities is modeled numerically. The load-bearing surfaces of the bearings are fabricated with micropores having the optimal density and geometry determined by the numerical modeling. Substantially conical micropores may be created by single laser pulses, with the pore size and shape controlled by controlling the laser beam profile, the laser beam power, and the optical parameters of the focusing system.

A microsurface structure in the form of micropores has several advantages over other microsurface structures, particularly those involving protruding structures, in moving load-bearing surfaces. These advantages include:

1. Ease of manufacturing.
2. The ability to optimize pore size, shape, and distribution using theoretical models.
3. Good sealing capability in stationary (static) conditions.
4. Providing microreservoirs for lubricant under starved lubrication conditions, for example, at startup and after lubricant loss.

Although hydrodynamic gas seals operate on essentially the same principles as hydrodynamic liquid seals, the well-known and well-characterized differences in the physical properties of the lubricants lead to different design and operating principles. The more substantial differences in physical properties include:

1. Pressure Distribution

In an incompressible fluid, a full converging-diverging film has pressures that are greater than ambient and pressures that are less than ambient. In a highly compressible gas film, however, the pressure may always be greater than ambient. The hydrodynamic pressure of an incompressible film is independent of the ambient pressure, hence, the absolute pressure can be determined by summing the pressure rise and the ambient pressure. The hydrodynamic pressure of a compressible film, on the other hand, is dependent on the ambient pressure.

2. Variable Density

Because gases are compressible, density must be treated as a variable to prevent significant error in modeling and performance. This significantly complicates the modeling mathematics and influences the behavior of the seal.

3. Dimensional Accuracy

Films in gas bearings tend to be appreciably thinner than in liquid (incompressible) lubrication, such that the minimum film thickness may be of the same order of magnitude as the surface roughness of the bearing surfaces.

4. Heat Transfer

In gas-lubricated seals, gas, rather than liquid, is used to cool and lubricate the seal faces. Characteristically, the heat capacities of gases are significantly lower than the heat capacities of liquids. Consequently, gas seals are much less suitable for removing heat generated at the seal faces.

5. Viscosity

Unlike incompressible fluids, in which the viscosity decreases with increasing temperature, the viscosity of compressible fluids tends to increase with increasing temperature.

The differences in the physical properties of compressible and incompressible lubricants are so substantial that the development of noncontacting, gas-lubricated seals for pumps, compressors, etc., has been described by Netzel (Lubrication Engineering, pp. 36–41, May 1999) as the most significant development in the field of sealing technology in the 20th century. Moreover, the principles for designing such gas-lubricated seals differ from those of their liquid-lubricated seal counterparts.

The most efficient design element of the prior art is the spiral groove seal face. Upon rotation of the shaft, pressure is built in each spiral groove. The hydrodynamic lift achieved separates the seal faces and allows the passage of gas across the seal face.

It must be emphasized that the spiral groove seal is subject to various operating problems, including low NPSH (net positive suction head) operation and mechanical problems that result in the loss of seal flush and other tribological problems at the seal faces. Moreover, the circumferential region with the spiral grooves substantially enlarges the width of the annular region of the seal relative to the width of comparable seals for liquid systems, thereby increasing the material and fabrication costs.

To date, the use of micropore technology as a means of providing hydrodynamic lift has been limited almost exclusively to liquid-lubricated seals. Although modeling of gas-lubricated hydrodynamic bearings having micropores was indicated by PCT Application No. US97/16764 to Etsion et al., which is incorporated by reference for all purposes as if fully set forth herein, and an air bearing at atmospheric-pressure having improved lift was disclosed, there has been little reason to think that the utilization of micropore hydrodynamic lift technology would provide lift of a magnitude of practical importance for most applications having gas-lubricated hydrodynamic seals, particularly in view of the above-described, marked differences in physical properties of compressible and incompressible lubricants and the resulting requisite differences in design of the seal. Moreover, as described below, the mating seal surfaces of the prior art—including those of PCT Application No. US97/16764—are complicated and costly to fabricate.

It must be emphasized that the hydrodynamic lift provided in liquid systems is based on the incompressibility of the liquid. Whereas the minimum pressure in the diverging region is limited by cavitation, the maximum pressure in the converging region is unlimited. It is this asymmetric behavior of the pressure curve that causes hydrodynamic lift. For this reason, the use of micropores for promoting hydrodynamic lift is most efficient for low-pressure systems. In high-pressure systems, the potential for pressure drop in the diverging region reduces the overall effect of the hydrodynamic lift.

Thus, because the hydrodynamic lift provided in liquid systems is related primarily to the cavitation property of the liquid, and because by definition, gases do not cavitate, there has been little reason to think that micropore technology would be suitable and advantageous for gas seals, that, unlike the hard-disk application, require appreciable separating forces.

Hence, the design of hydrodynamic gas-lubricated seals, to date, has focused primarily on spiral-groove technology and other conventional technologies that are known to be suitable for gas systems.

One of the main features of hydrodynamic, gas-lubricated seals is that the gas pressure is instrumental in separating the faces and avoiding excess wear due to contacting. In conventional shaft seal systems for industrial gas turbines and the like, the main shaft seal is kept close to the shaft by the pressure difference across the seal, with the high pressure being applied radially beyond the seal. If the pressure gradient is too high, the seal is forced against the shaft. To reduce the magnitude of this problem, conventional shaft seals are sometimes designed with lifting devices on the inside faces that generate hydrodynamic lift and reduce wear resulting from contact pressures.

The fashioning of an annular gas seal with an inner radial surface that converges with the surface of the shaft is complicated and expensive, particularly in view of the dimensional accuracy required for gas systems.

Main shaft gas seals are of prime importance in aircraft engines. As with industrial gas turbines, both seal longevity and low-pressure performance limitations are currently of major concern in the design and operation of main shaft seals for aircraft engines.

Two main types of seals are used in aircraft main shaft seal applications. Circumferential seals are used most frequently in low pressure applications and face seals are used in higher pressure applications, The purposes of these bearing sump seals are to keep the hot gases out of the bearing sump, to contain the bearing cooling oil in the bearing sump chamber, and to keep particulates away from the bearing.

The circumferential seal consists of a metallic housing mounted to the stationary frame of the engine. Internal to the housing is a carbon ring consisting of multiple segments, which is held as a ring by a circumferential garter spring. The bore of the carbon ring rubs against a hardcoated sleeve on the rotating shaft, creating a barrier to leakage. The carbon ring also creates a static seal with the seal housing.

Face seals consist of a metallic holder mounted to the stationary frame of the engine. A solid carbon ring, usually shrunk into a metallic band, is held by the holder against rotation. Compression springs, axially mounted between the holder and the carbon ring, push the carbon ring axially against a rotating shoulder or mating ring mounted on the shaft. The mating ring is usually hardcoated to minimize wear. A static seal located at the interface between the carbon ring and the holder prevents leakage between these two components.

Contact between the shaft sleeve (or mating ring) and carbon seal ring causes wear of their surfaces which, over time, deteriorates the sealing capability. This wear problem is more severe at higher gas pressures due to increases in contact pressure between the seal mating surfaces. Due to the excessive wear in these designs under many conditions, non-contacting types of seals such as labyrinth seals and face seals with special lift geometries are being used in place of contacting seals. However, labyrinth seals provide poor sealing and the cost of these lift geometries on seal surfaces is high.

There is thus a widely recognized need for, and it would be highly advantageous to have, a gas-lubricated hydrodynamic seal that would be of simple design, easy to manufacture, and more efficient, robust and economical than heretofore known.

As taught by Müller ("Face Seals: Hydrostatic and Hydrodynamic", ASLE Education Course on Fluid Film Sealing, 1972), a stable separation of the hydrodynamic seal faces is obtained by active hydrodynamic pressure generation between the faces. The magnitude of separating forces generated, and hence the efficacy of the hydrodynamic sealing, depends inherently on surface speed and viscosity. More specifically, these properties provide the physical basis for hydrodynamic seals having micropores, as is evident from the general form of the one-dimensional Reynolds equation, $$\frac{\partial}{\partial x}\left(\rho \cdot h^3 \cdot \frac{\partial P}{\partial x}\right) = 6 \cdot \mu \cdot v \frac{\partial (\rho \cdot h)}{\partial x}$$

wherein:
  P is the hydrodynamic pressure;
  ρ is the fluid density; ρ is the fluid density;
  h is the local film thickness;
  μ is the fluid viscosity
  v is the sliding velocity in the x direction As mentioned above, U.S. Pat. No. 5,952,080 to Etsion et al. discloses a method for designing bearings, of improved performance, the load-bearing surfaces of which feature micropores. The term "bearing" as defined therein, includes all systems with surfaces in contact that bear loads and move relative to each other, for example, reciprocating systems such as pistons, and not just bearings per se.

U.S. Pat. No. 6,002,100 to Etsion discloses a method for designing bearings of improved performance, the load-bearing surfaces of which feature micropores. The micropores are 2 to 10 microns deep and preferably have an aspect ratio on the order of 7 to 20. According to U.S. Pat. No. 6,002,100, the inventive method "is based on modeling a hydrodynamic pressure distribution, and therefore applies only to lubricated load-bearing surfaces in motion relative to each other".

Hydrostatic seals (gas and liquid) are clearly distinguished from hydrodynamic seals (gas and liquid) in that the separation forces are generated by pressure differential and not by surface speed and viscosity. It is only natural, therefore, that the above-mentioned patents limit themselves to lubricated load-bearing surfaces in motion relative to each other, i.e., to hydrodynamic applications.

Moreover, it is known that with hydrodynamic liquid seals having micropores, the performance becomes increasingly impaired with increasing operating pressure, because the pressure curve over the diverging and converging regions of the micropore becomes considerably less asymmetric due to the larger pressure drop in the diverging region. As a result, the hydrodynamic lift provided by the micropores can become substantially negligible at pressures above about 15 atmospheres.

By sharp contrast, in hydrostatic seals the hydrostatic lift is independent of the relative motion between seal faces. Moreover, viscosity is unimportant in hydrostatic seals, as the dynamic term in the Reynolds equation vanishes. The face separation is governed by the hydrostatic pressure profile along the mating faces. Perhaps most significantly, hydrostatic seals operate in the pressure range of 5–200 atmospheres and more typically in the range of 10–100 atmospheres, wherein hydrodynamic lubrication is less effective, and wherein micropore technology is known to be particularly ineffective.

In addition to hydrostatic liquid seals, hydrostatic gas seals are also common. As described above, the efficacy of micropore technology has been known only for liquid hydrodynamic systems, which utilize incompressible liquids with medium-to-high viscosities. The successful application of micropore technology to seals that are both hydrostatic and gas-lubricated would be particularly surprising, because gases are characterized by high compressibility and low viscosity, both of which impair hydrodynamic lift.

It would be highly advantageous to have liquid and gas hydrostatic seals that are based on or enhanced with micropore technology, such that the known features of micropore-based hydrodynamic seals—simple design, ease of fabrication, superior hydrodynamic lift and reduced wear, reliability and economy—could be imparted to hydrostatic seals.

SUMMARY OF THE INVENTION

It is an object of the present invention to provide hydrodynamic and hydrostatic seals having faces that are simpler and less expensive to fabricate than existing converging-face technologies, yet enable and provide adequate lift.

It is another object of the present invention to provide a hydrodynamic gas-lubricated seal that provides superior hydrodynamic lift relative to prior-art seals, thereby reducing wear resulting from contact pressures and increasing the useful life of the seal.

It is a further object of the present invention to provide a hydrodynamic, grooveless gas-lubricated seal that is more compact, and easier and less expensive to fabricate relative to seals of prior art.

It is an object of the present invention to provide a main shaft gas seal system with enhanced hydrodynamic lift, such that seal longevity is significantly increased, without compromising sealing capability.

It is a further object of the present invention to provide a main shaft gas seal system that is simple and economical relative to existing systems, including labyrinth and other non-contacting seal systems.

It is yet another object of the present invention to provide a hydrostatic seal, lubricated by gas and/or liquid, that is more compact, and easier and less expensive to fabricate relative to hydrostatic seals of prior art.

According to the present invention there is provided a lubricated hydrostatic seal comprising (a) two surface regions having opposing surfaces; (b) a plurality of micropores in one or more of said surfaces having a pore geometry; and (c) a pressure-induced flow of fluid between said surfaces, wherein said pressure-induced flow of fluid past said micropores provides a lifting force between the surfaces.

In a preferred embodiment, the fluid is a gas. In another preferred embodiment, the fluid is a liquid.

In sharp contrast with known face seals, which are characterized by converging surfaces (including stepped surfaces), I have discovered that the use of micropore technology allows the opposing surfaces of such seals to be nominally parallel. The fabrication of nominally-parallel surfaces is more simple and considerably less expensive than the fabrication of angled and/or stepped surfaces. The design and fabrication of nominally-parallel seal surfaces can be applied to a wide variety of seals and bearings having micropores, including liquid-lubricated and gas-lubricated hydrodynamic seals, as well as hydrostatic seals.

Whereas piston and cylinder systems of the known art typically require an axially non-uniform clearance between the radial surface region of the piston or piston ring and the cylinder lining, the present invention allows the use of a simple and easy to fabricate surface that is nominally parallel. In a preferred embodiment of the present invention there is provided a lubricated hydrodynamic seal comprising: (a) a cylinder having an inner surface region, the inner surface region having a first surface; (b) a piston unit positioned inside the cylinder and having a radial surface region, the radial surface region having a second surface; (c) a plurality of micropores in one or more of the surfaces having a pore geometry; and (d) a fluid situated between the first surface and second surface, wherein the fluid flows past the micropores, thereby generating a lifting force between the surfaces, and wherein the first surface and the second surface are nominally parallel.

In a preferred embodiment, the micropores on the piston unit and/or cylinder lining are between about 3 microns and about 15 microns deep. More preferably, the micropores range between about 5 microns and about 10 microns deep.

In another preferred embodiment, the micropores cover between about 5% and about 30%, by area, of the surface. More preferably, the micropores cover between about 10% and about 20%, by area, of the surface.

In yet another preferred embodiment, the piston unit further includes at least one piston ring, and wherein the surface on the radial surface region is a piston ring surface. In addition to having micropores on the piston rings, the radial surface of the piston can be covered with micropores. This enhances the lift and provides other advantages that are described in greater detail below.

In yet another preferred embodiment, the pore geometry of the first surface and the pore geometry of the second surface are optimized for conditions selected from the group consisting of hydrodynamic load bearing conditions, starved lubrication conditions, or both of the above.

According to the present invention there is provided a hydrodynamic gas seal comprising: (a) two surface regions having opposing surfaces; (b) a plurality of micropores in at least one of the surfaces, the plurality of micropores having a pore geometry; and (c) a gas located between the surfaces, wherein the gas is induced to flow past the micropores by the relative movement of the surfaces, thereby generating a lifting force between the opposing surfaces, and wherein the opposing surfaces are nominally parallel.

The micropores, applied to one of the mating surfaces of the seal, act as micro-hydrodynamic bearings, providing a surprisingly powerful and beneficial hydrodynamic lift that inhibits or appreciably reduces contacting between conforming faces and substantially reduces friction and wear.

The pore geometry is parameterized by a depth $h_p$ and a diameter D, and wherein $h_p/D$ ranges preferably from 0.002–0.05, and more preferably from 0.005–0.02.

In a preferred embodiment, the pore geometry is substantially rotationally symmetric.

In another preferred embodiment, the micropores are dispersed on the surface in a substantially uniform manner. Preferably, the micropores cover between 15–45% by area of the surface, and more preferably, the micropores cover between 20–30 by area % of the surface.

In a preferred embodiment, the micropores on the surface of the hydrodynamic gas seal are at least about 100–150 microns in diameter. Preferably, the micropores should be about 1–3 microns deep.

In a preferred embodiment, the micropores are fashioned in between the lifting devices (spiral grooves, Raleigh steps, etc.) of gas-lubricated face seals of the prior art, such that the hydrodynamic lift of such seals is enhanced and the useful life of these seals is improved. Enhanced hydrodynamic lift can also be provided by fashioning micropores on the surface of the sealing dam.

In another preferred embodiment, the opposing, nominally parallel surfaces of the surface regions are radially conforming. Such a configuration is particularly appropriate for gas-lubricated circumferential shaft seals.

In yet another preferred embodiment, the seal according to the present invention is a hybrid seal that provides both hydrodynamic and hydrostatic lift. At high relative speeds, lift is generated both by hydrodynamic separating forces and by hydrostatic separating forces. At low relative speeds, the hydrodynamic component of the lift becomes negligible, however, hydrostatic lift is based on pressure differential along the sealing gap and is substantially unaffected. The lubricated hybrid seal comprises: (a) two surface regions having opposing surfaces, the opposing surfaces having relative movement to one another; (b) a plurality of micropores in one or more of the opposing surfaces having a pore geometry; and (c) a fluid situated between the opposing surfaces, wherein the fluid is induced to flow by the relative movement of the opposing surfaces past the micropores and by pressure differential along the opposing surfaces, such that a lifting force between the opposing surfaces is provided.

In a preferred embodiment, the use of micropores allows the opposing surfaces of the hybrid seal surface regions to be nominally parallel.

In a preferred embodiment, the hybrid seal is lubricated by gas. In another preferred embodiment, the hybrid seal is lubricated by liquid.

In yet another preferred embodiment, the respective pore geometries are optimized for hydrostatic lift and for hydrodynamic lift.

As used herein in the specification and claims section below, the term "seal" includes all systems with surfaces in contact that bear loads, including bearings.

As used herein in the specification and claims section below, the term "nominally parallel" or "nominally parallel surfaces" refers to surfaces whose macroscopic contours are substantially parallel. One example of such nominally parallel surfaces is flat plates having surfaces positioned in a parallel fashion. Another example is a ring encompassing an axis, wherein the ring has an inner surface parallel to the radial surface of the axis. This surface geometry is known more specifically as "radially-conforming".

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a lubricated hydrostatic seal comprising (a) two surface regions having opposing surfaces; (b) a plurality of micropores in one or more of the surfaces having a pore geometry; and (c) a fluid situated between the surfaces, wherein a pressure-induced flow of fluid past the micropores provides a lifting force between the surfaces.

In a preferred embodiment, the opposing surfaces of the surface regions are in nominally-parallel configuration, which is simple to manufacture and considerably less expensive than the various converging-surface configurations of the prior art. The nominally-parallel surface configuration can also be utilized in both liquid-lubricated and gas-lubricated hydrodynamic seal applications and in hybrid seals (combined hydrodynamic and hydrostatic), as will be described in further detail below.

The principles and operation of lubricated seals according to the present invention may be better understood with reference to the drawings and the accompanying description.

Figure 1:
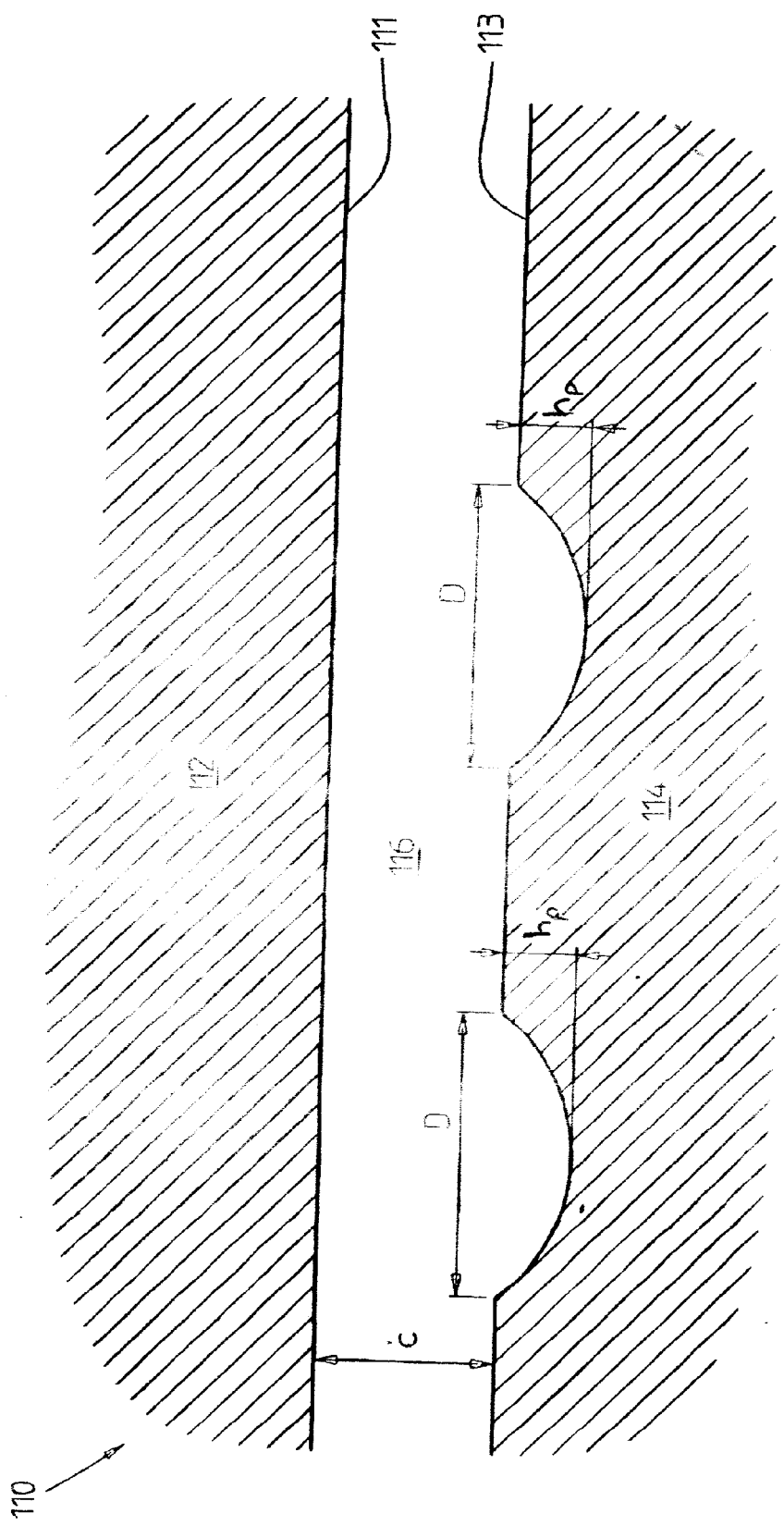
FIG. 1 is a schematic cross-section of a bearing of the prior art having spherical micropores.

Referring now to the drawings, FIG. 1, taken from U.S. Pat. No. 5,952,080 to Etsion et al., is a schematic cross section of a bearing having a surface containing micropores. The bearing 110 comprises an upper surface 111 of an upper seal ring 112 and a lower surface 113 of a lower seal ring 114, separated by a gap 116 of width c. In lower surface 113 are two spherical pores 120 and 122 of diameter D and depth $h_p$. Alternative geometries, including hemispherical and conical pores, have been described in U.S. Pat. No. 5,952,080.

Although it might appear that the mating surfaces of the bearing disclosed in U.S. Pat. No. 5,952,080 are nominally parallel, it is evident from the specification that nominally-parallel faces is an assumption made to allow the development of a control cell for the purpose of modeling and calculations. Many such assumptions are used in the above-mentioned specification, including:

1. The seal is an all-liquid noncontacting seal, with parallel faces separated by a constant film thickness.
2. Curvature effects of the seal rings can be neglected. Hence, a uniform circumferential velocity U is assumed, and a linear pressure drop from the seal's outer to inner circumference.
3. The seal fluid is a Newtonian liquid having a constant viscosity, $\mu$.
4. Half-Sommerfeld condition is assumed whenever cavitation occurs.

Although this assumption introduces a certain error in the flow around the control cell, it saves computing time without altering the general trend of the solution for load capacity.

These assumptions are not made as a means of improving seal performance or to reduce fabrication cost, etc.; they are made to simplify a complex system into one that can be modeled theoretically and solved with facility, without altering the general trend of the solution. The above-mentioned specification cites numerous advantages of micropore technology, but fails to disclose the significant benefits of nominally parallel seal faces.

Figure 2A:
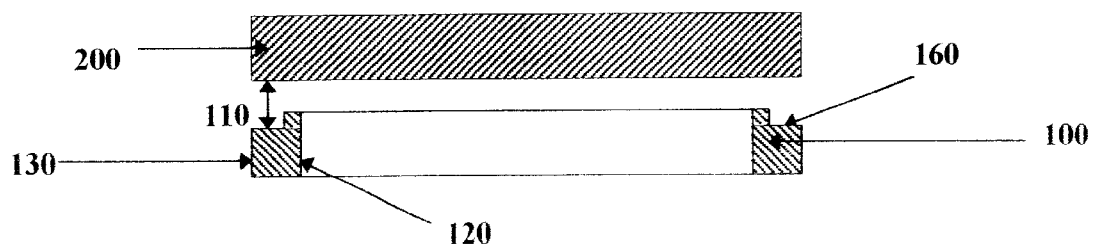
FIG. 2a is a cross-sectional view of a seal ring of the prior art, having a stepped face.
Figure 2B:
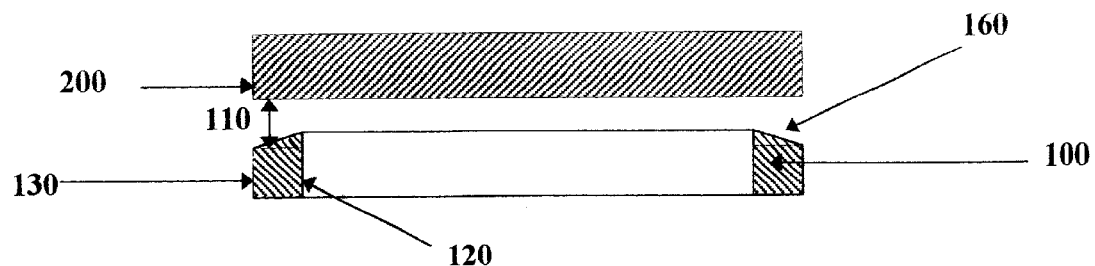
FIG. 2b is a cross-sectional view of a seal ring of the prior art, in which the sealing surface has gradually converging faces.

FIGS. 2a and 2b are schematic cross sectional views of hydrostatic seal rings according to prior art. The top seal ring 200 is flat and disk-shaped. The bottom seal ring 100 in FIG. 2a has a stepped upper surface 160 opposing the top seal ring 200, such that the gap 110 between the outside 130 and the inside 120 of the seal ring is reduced. The passing of fluid through the gap 110 between converging opposing surfaces produces a hydrostatic lift effect.

The bottom seal ring 100 in FIG. 2b has a flat, converging upper surface 160 opposing the top seal ring 200. As in FIG. 2a, the gap 110 between the outside 130 and the inside 120 of the seal ring is reduced. The passing of fluid through the gap 110 between converging opposing surfaces generates hydrostatic lift.

Figure 3A:
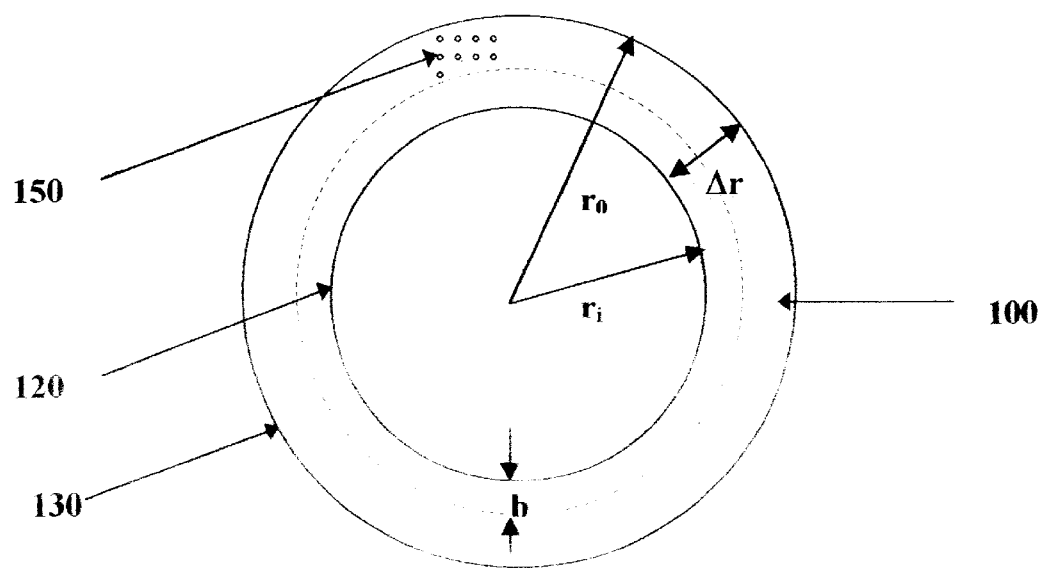
FIG. 3a is a top view of a hydrostatic seal ring having a plurality of micropores, according to the present invention.

FIG. 3a is a schematic top view of an annular hydrostatic seal ring 100 according to the present invention. A radial pressure drop is maintained between the outside 130 and the inside 120 of the seal ring. The pores are arranged in a rectangular fashion, but they also could be arranged in other arrangements, regular (e.g., concentric) or irregular. Preferably, the plurality of micropores 150 is more heavily distributed towards the outer region of the annulus. An inner surface region of the annulus, of width b, is completely free of micropores and acts in a similar fashion to a sealing dam. The entire width of the annulus, $\Delta r$, is defined by $\Delta r = r_o - r_i$, wherein $r_o$ is the radius of the outside 130 of the seal ring, and $r_i$ is the radius of the inside 120 of the seal ring. Two important parameters in characterizing hydrostatic face seal performance are the width ratio, $\beta$, defined by $$\beta = b/\Delta r$$

and the clearance ratio, $\alpha$, the effective ratio between the large clearance and the small clearance between seal faces, defined as $$\alpha = 1 + S_p \cdot \frac{h_p}{c} \cdot \left(\frac{1}{2} + \frac{2}{3} \cdot \varepsilon^2\right)$$

wherein:
  $S_p$ is the pore density or coverage (area fraction);
  $h_p$ is the pore height;
  c is the clearance between seal faces; and
  $\varepsilon$ is the ratio $h_p/D$, wherein D is the pore diameter The hydrostatic seal is most effective for values of $\alpha$ ranging from 1.4 to 1.8, and more preferably, for values of $\alpha$ ranging from 1.5 to 1.6.

Figure 3B:
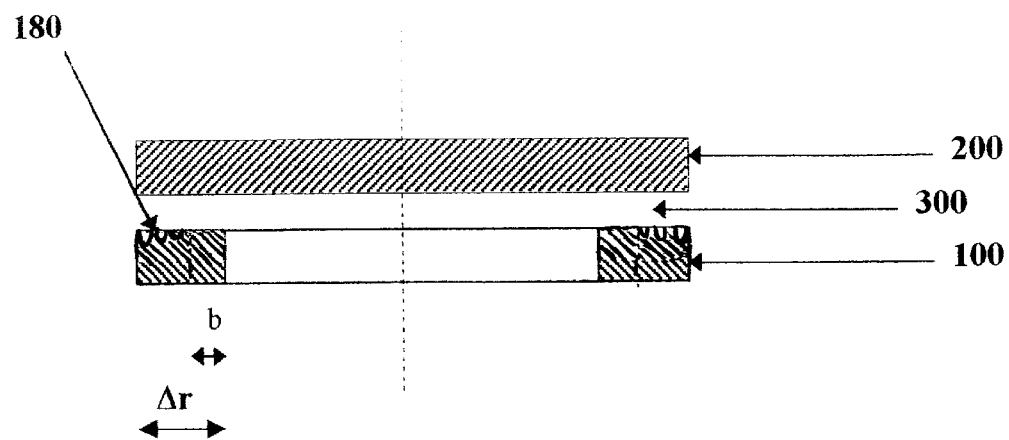
FIG. 3b is a cross-sectional view of the hydrostatic seal ring of FIG. 3a, along with the mating seal face, showing the positioning of the micropores on the hydrostatic seal ring.

FIG. 3b is a schematic cross section of the top 200 and bottom 100 rings according to the present invention. The fluid is situated in the gap 300 between the top 200 and bottom 100 rings. Unlike the above-described, expensive seal geometries of the prior art, the design according to the present invention allows the opposing seal faces to be nominally parallel. The presence of micropores provides effectively-higher clearance over a portion of the seal width ($\Delta r - b$), such that hydrostatic lift is generated. The change in the effective gap width using micropores can be achieved in various ways, including having micropores of increasing depth 180 towards the high pressure side of the seal faces, and/or having a higher micropore density (not shown) towards the high pressure side of the seal faces.

It is evident from the above description that the use of micropores to achieve lift in hydrostatic seals differs considerably from the use of micropores to achieve lift in hydrodynamic seals. The hydrodynamic lift provided by micropores results from the asymmetric pressure curve across the pores. This asymmetric pressure curve is generated by the relative motion of the sealing faces.

In hydrostatic seals, however, the lift is generated by the pressure drop across the seal. The purpose of the micropores in hydrostatic applications is to effectively widen the gap between face seals in a skewed manner, such that the face seal behaves like a face seal with converging surfaces. I have found that hydrostatic face seals with micropores are capable of achieving excellent lift, and that the manufacture of face seals with micropores and nominally-parallel surfaces is particularly easy and inexpensive.

Hydrostatic seals are generally applied at operating pressures of 5 to 200 or more atmospheres, and more typically, between 10 and 200 atmospheres. Hydrodynamic liquid seals are substantially ineffective above about 15 atmospheres, as the pressure curve becomes increasingly symmetric. Thus, the use of micropore technology in hydrostatic seals according to the present invention significantly increases the range of applications.

Because the physical basis for utilizing micropore technology in hydrostatic seals is so radically different from hydrodynamic seals, it stands to reason that the various characteristics of the individual micropore and the micropore plurality will also change radically. In hydrodynamic seals, sealing performance is largely determined by the ratio between the pore depth and the pore diameter. In hydrostatic seals, however, it is the clearance ratio (and to a lesser extent, the width ratio) that most strongly influences the efficacy of the seal.

It has been discovered in the present invention that the optimal micropore depth in hydrostatic applications is typically about 20–100 microns, an order of magnitude greater than the optimal micropore depth for hydrodynamic bearings disclosed in U.S. Pat. No. 5,834,094.

In a preferred embodiment, the hydrostatic seal is lubricated by gas. In another preferred embodiment, the hydrostatic seal is lubricated by liquid.

In a preferred embodiment, at least one of the opposing surfaces of the hydrostatic seal contains a radially outward surface ($\Delta$r-b) and a radially inward surface (b), wherein the plurality of micropores is situated on the radially outward surface, the radially outward surface having a micropore coverage of between 15 area-% and 45 area-%.

In yet another preferred embodiment, the seal according to the present invention is a hybrid seal (FIGS. 4a, 4b) that provides both hydrodynamic and hydrostatic lift. At high relative speeds, lift is generated both by hydrodynamic separating forces and by hydrostatic separating forces. At low relative speeds, the hydrodynamic component of the lift becomes negligible, however, hydrostatic lift is based on pressure along the gap, such that the hydrostatic lift is substantially unaffected. Micropores designed for hydrostatic lift provide an effective converging gap, which, in a similar manner to seals with converging faces, results in hydrostatic lift.

Figure 4A:
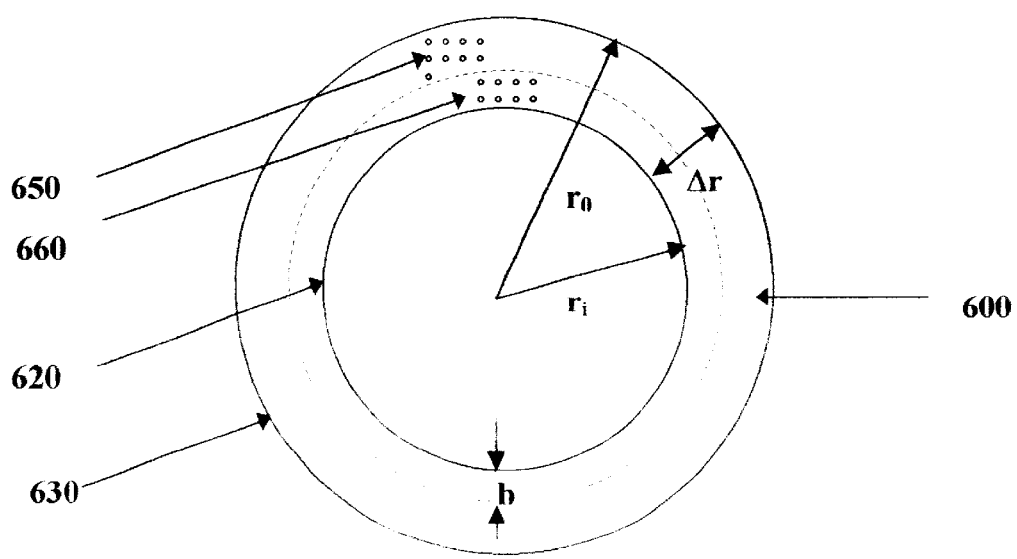
FIG. 4a is a top view of a hybrid seal ring having two pluralities of micropores, which provide hydrodynamic and hydrostatic lift, according to the present invention.

FIG. 4a is a schematic top view of an annular hybrid seal ring 600 according to the present invention. A radial pressure drop is maintained between the outside 630 and the inside 620 of the seal ring. The pores are arranged in a rectangular fashion, but they also could be arranged in other arrangements, regular (e.g., concentric) or irregular. Two pluralities of micropores—an outer plurality of micropores 650 and an inner plurality of micropores 660—are situated on the face of the seal ring 600, with the inner plurality 660 situated in the inner surface region of the annulus, of width b.

Figure 4B:
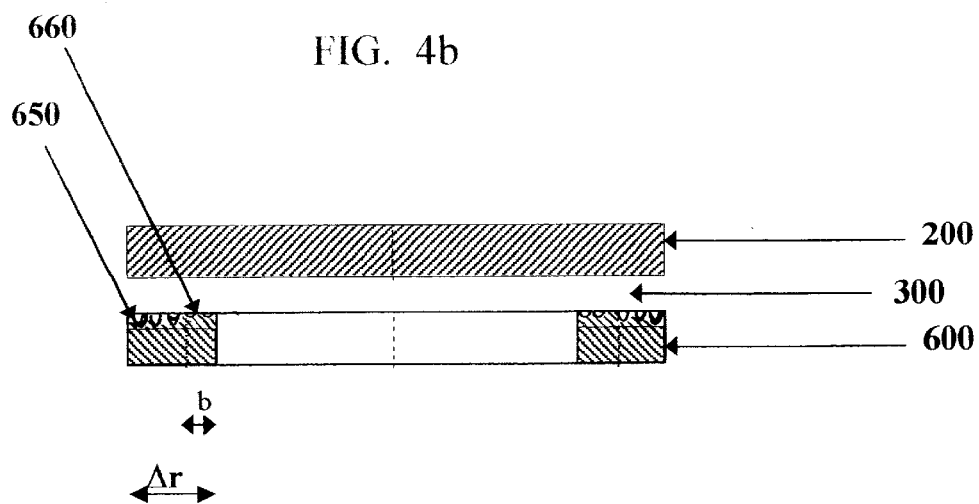
FIG. 4b is a cross-sectional view of the hybrid seal ring of FIG. 4a, along with the mating seal face, showing the positioning of the two respective pluralities of micropores on the seal ring.

FIG. 4b is a schematic cross section of the top 200 and bottom 600 rings according to the present invention. The fluid is situated in the gap 300 between the top 200 and bottom 600 rings. The opposing surfaces of the top 200 and bottom 600 rings are nominally parallel. Preferably, the outer plurality of micropores 650 is more heavily distributed towards the outer region of the annulus, and is characteristically deeper than the inner plurality of micropores 660. The outer plurality of micropores 650 is preferably optimized for hydrostatic lift, whereas the inner plurality of micropores 660 is preferably optimized for hydrodynamic lift.

As mentioned above, U.S. Pat. No. 5,952,080 to Etsion et al. discloses a method for designing bearings, of improved performance, the load-bearing surfaces of which feature micropores. The term "bearing" as defined therein, includes all systems with surfaces in contact that bear loads and move relative to each other, for example, reciprocating systems such as pistons, and not just bearings per se.

Figure 5:
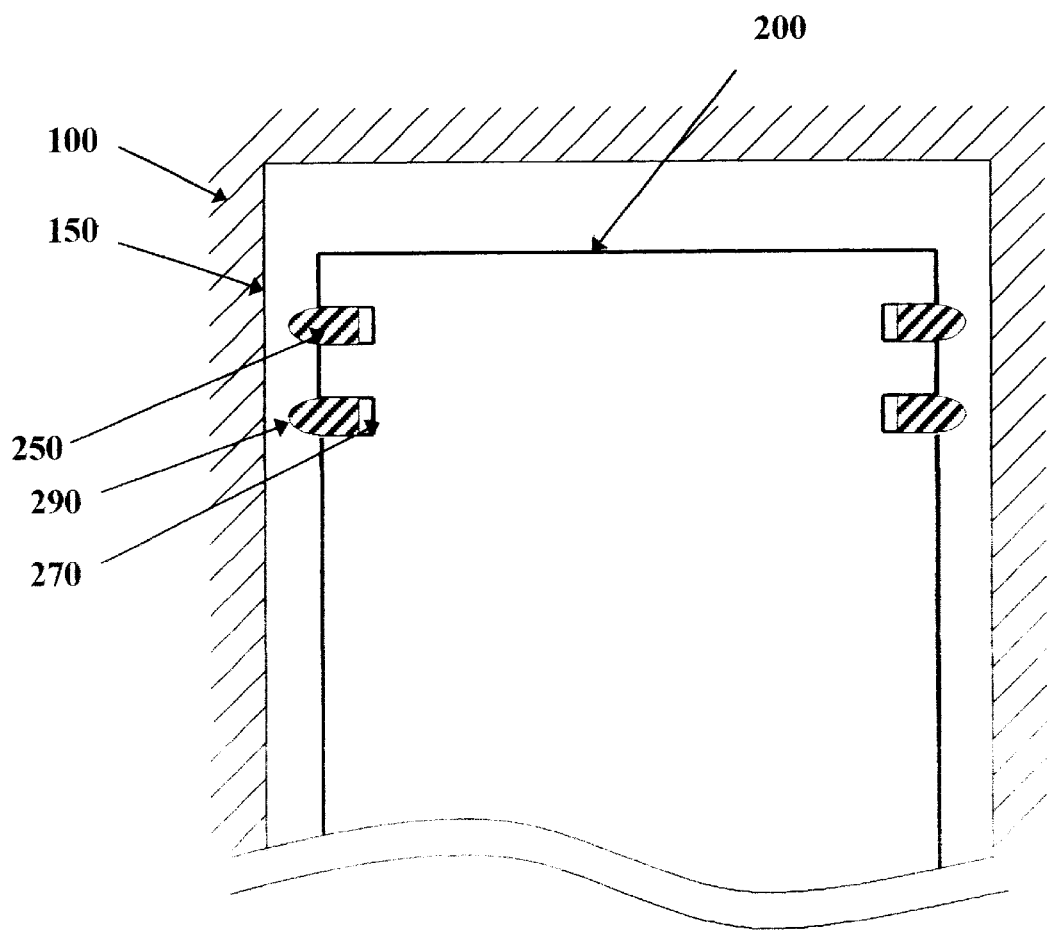
FIG. 5 is a cross-sectional view of a portion of a piston with load-bearing piston rings in a cylinder, according to the prior art, wherein the load-bearing piston rings have an axially converging-diverging contacting surface.

FIG. 5 provides a cross-sectional view of a portion of a piston assembly 200 in a cylinder 100, according to the prior art. The piston assembly includes load-bearing piston rings 250 that are fitted on to grooves 270 on the piston surface. These load-bearing piston rings typically have a converging-diverging contacting surface 290 that contacts the cylinder lining 150. The converging-diverging surface is designed to generate separating forces between the rings and the cylinder lining 150.

According to U.S. Pat. No. 5,952,080, it is possible to fashion the load-bearing surface with micropores to improve performance. However, the improved performance comes at the expense of increased fabrication costs.

However, I have discovered that fabrication costs can actually be reduced by replacing the design of the converging-diverging contacting surface with designs that are easier to fabricate, such as textured contacting surfaces that are nominally-parallel with the cylinder lining. The lift can be further enhanced by the fabrication of micropores on the surface of the piston itself. Although the piston surface does not actually contact the cylinder lining, the distance is close enough (and the relative speed of the piston is high enough) to induce hydrodynamic lift.

Figure 6A:
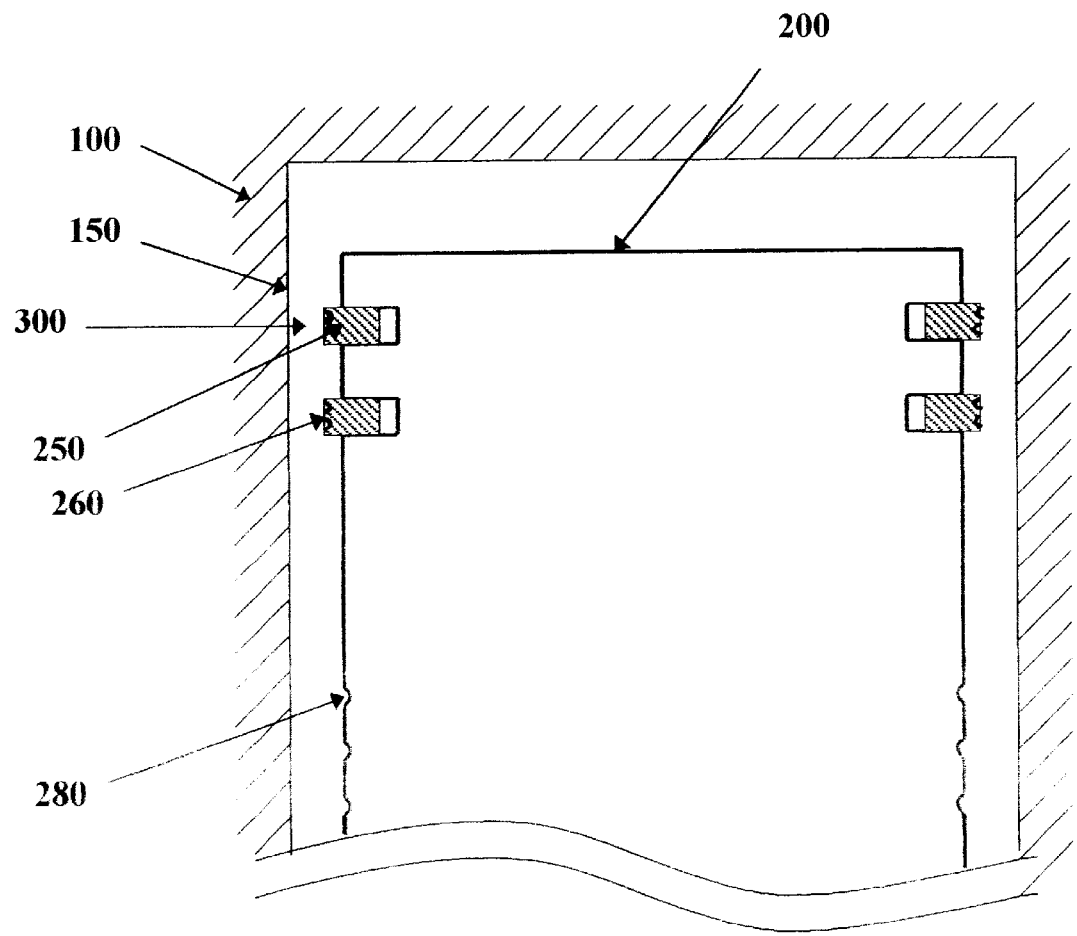
FIG. 6a is a cross-sectional view of a portion of a piston with piston rings in a cylinder, according to the present invention, wherein the piston rings and the piston surface have a textured surface containing micropores.

FIG. 6a provides a cross-sectional view of a portion of a piston 200 with load-bearing piston rings 250 in a cylinder 100, according to the present invention, wherein a fluid is situated in the gap 300 between the piston and the cylinder. The load-bearing ring surface 260 and the piston surface 280 are textured with micropores. These micropores act as micro-hydrodynamic bearings, together providing a surprisingly powerful lift that inhibits or appreciably reduces contacting between the conforming faces and substantially reduces friction and wear.

Figure 6B:
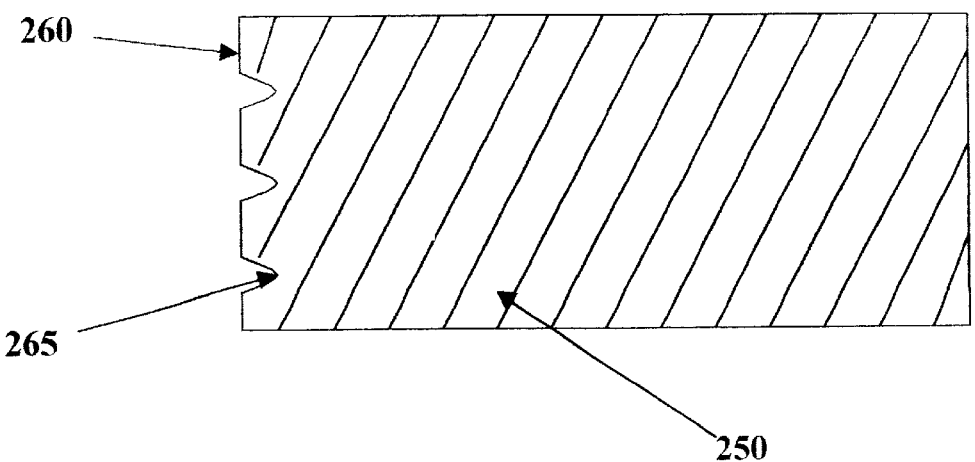
FIG. 6b is a cross-section of the load-bearing piston ring of FIG. 6a, showing the textured piston-ring surface that is nominally-parallel with the cylinder lining.

FIG. 6b is a magnification of a portion of the load-bearing piston ring 250 of FIG. 6a. The micropores 265 generate sufficient separating forces to allow the piston-ring surface 260 to be nominally-parallel with the cylinder lining.

Referring back to FIG. 6a: because the gap between the piston 200 and cylinder lining 150 is very small, the relative speed of the piston is high, and the available surface area on the piston is large, substantial hydrodynamic lift can be generated by micropores 280 on the piston surface. Occasional, slightly-eccentric motion is normal for pistons moving inside cylinders. This motion can cause contact between the radial surface of the piston and the cylinder lining, leading to wear and failure. The micropores on the piston surface dampen this motion, reducing contact and wear. Moreover, in the case of piston-ring 250 erosion or failure, the micropores on the piston surface provide sufficient lift to prevent damage to the piston.

In a preferred embodiment, micropores are fashioned on the surface of the cylinder. In another preferred embodiment, the micropore geometry on the load-bearing surfaces is optimized for both hydrodynamic load-bearing conditions and for starved lubrication conditions. For example, the piston-ring surface and the piston surface can be optimized, by known techniques, for hydrodynamic load-bearing conditions, with the cylinder lining being optimized, also by known practice, for starved lubrication conditions.

According to the present invention there is provided a gas-lubricated hydrodynamic seal comprising: (a) surface regions having opposing surfaces, having relative movement to one another; (b) a plurality of micropores in one or more of the surfaces having a pore geometry; and (c) a gas located between the opposing surfaces and induced to flow by the relative movement of the surfaces, wherein the flow past the micropores provides a lifting force between the surfaces, and wherein the opposing surfaces are nominally parallel.

The micropores, applied to one or more of the mating surfaces of the seal, provide a surprisingly powerful and beneficial hydrodynamic lift that inhibits or appreciably reduces contacting between conforming faces and substantially reduces friction and wear.

The pore geometry is parameterized by a depth $h_p$ and a diameter D, and wherein $h_p/D$ ranges preferably from 0.002–0.05, and more preferably from 0.005–0.02.

In a preferred embodiment, the pore geometry is substantially rotationally symmetric.

In another preferred embodiment, the micropores are dispersed on the surface in a substantially uniform manner. Preferably, the micropores cover between 15–45 area-% of the surface, and more preferably, the micropores cover between 20–30 area-% of the surface.

In a preferred embodiment, the micropores on the surface of the gas-lubricated hydrodynamic seal have a diameter of at least about 100–150 microns.

Figure 7:
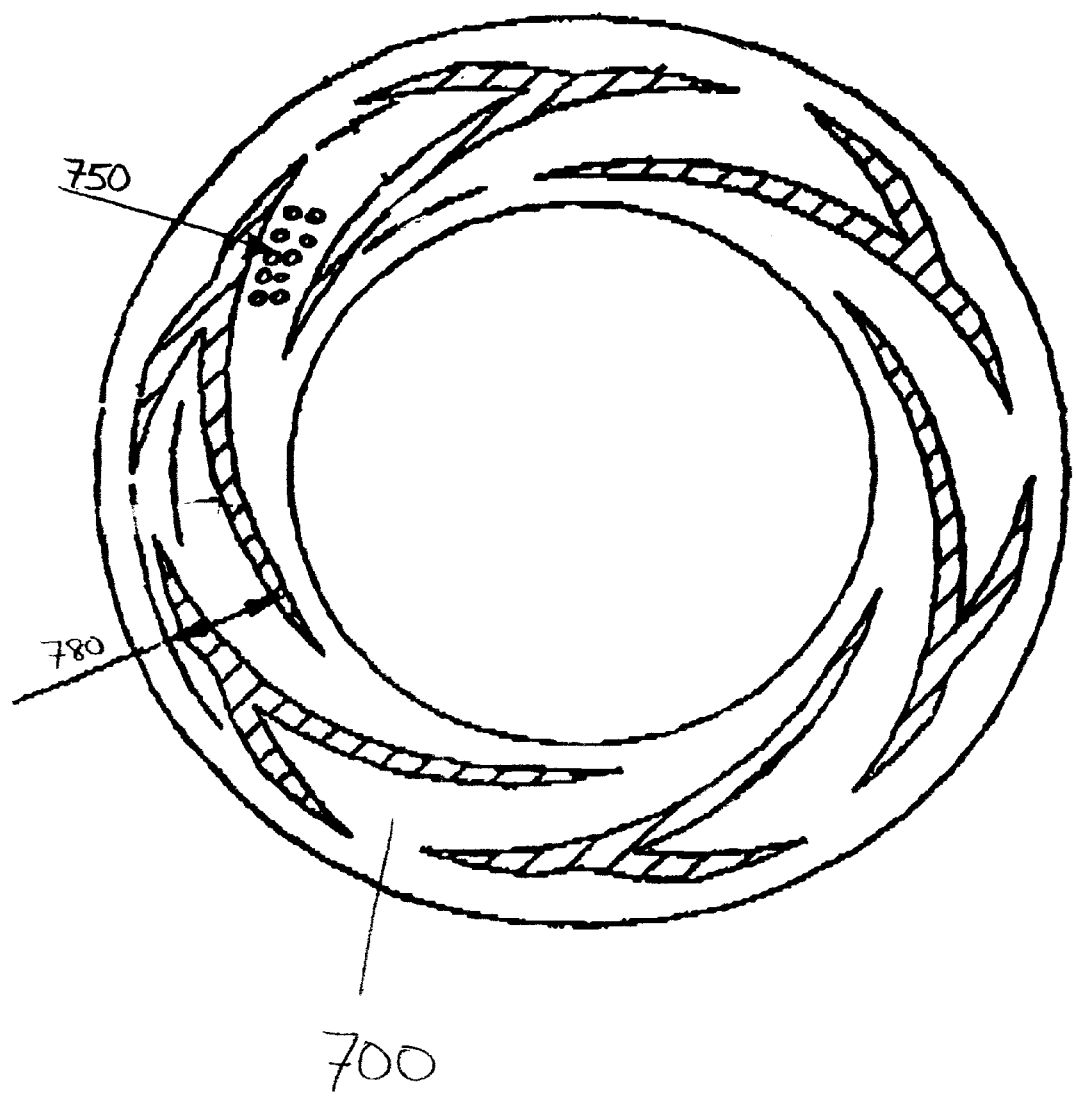
FIG. 7 is a top view of a gas-lubricated hydrodynamic seal ring having spiral grooves, in which a plurality of micropores has been fashioned in order to enhance hydrodynamic lift.

In a preferred embodiment illustrated in FIG. 7, the micropores 750 are fashioned in between the spiral grooves 780 of gas-lubricated face seals 700, such that the hydrodynamic lift of such seals is enhanced and the performance and useful life of these seals is improved.

Similarly, the micropores can also be fashioned on the face of the sealing dam, instead of or in addition to micropores in between the spiral grooves.

In another preferred embodiment, the opposing, nominally parallel surfaces of the surface regions are radially conforming. Such a configuration is particularly appropriate for gas-lubricated circumferential shaft seals. The use of such micropores on one or both of the seal faces reduces contact and wear and extends the effective operating lifetime of the seal.

It will be appreciated that the above descriptions are intended only to serve as examples, and that many other embodiments are possible within the spirit and the scope of the present invention.

What is claimed is:

1. A gas-lubricated hydrodynamic seal comprising:
    (a) two surface regions having opposing surfaces;
    (b) a plurality of micropores in at least of one of said opposing surfaces; said plurality of micropores having a pore geometry; and
    (c) a gas located between said opposing surfaces,
wherein said gas is induced to flow past said plurality of micropores by a relative movement of said opposing surfaces, and wherein said micropores are designed and positioned such that said flow past said micropores generates a lifting force between said opposing surfaces, and wherein said opposing surfaces are nominally parallel.

2. The device of claim 1, wherein said pore geometry is parameterized by a depth $h_p$ and a diameter D, and wherein $h_p/D$ is between about 0.002 and about 0.05.

3. The device of claim 2, wherein $h_p/D$ is between about 0.005 and about 0.02.

4. The device of claim 1, wherein said pore geometry is substantially rotationally symmetric.

5. The device of claim 1, wherein said micropores are distributed on said surface substantially uniformly.

6. The device of claim 1, wherein said micropores cover between 15 area-% and 45 area-% of said surface.

7. The device of claim 1, wherein said micropores cover between 20 area-% and 30 area-% of said surface.

8. The device of claim 1, wherein at least some of said micropores have diameters of at least about 100 microns.

9. The device of claim 1, further including spiral grooves around said opposing surfaces and a sealing dam having a surface, and wherein said micropores are fashioned in between said spiral grooves.

10. The device of claim 9, wherein said micropores are fashioned on said surface of said sealing dam.

11. The device of claim 1, wherein said surface regions having opposing surfaces are radially conforming.

12. A lubricated hydrostatic seal comprising:
    (a) two surface regions having opposing surfaces;
    (b) a plurality of micropores in at least one of said opposing surfaces, said plurality of micropores having a pore geometry; and
    (c) a fluid located between said opposing surfaces,
wherein an externally imposed radial pressure differential induces said fluid to flow between said opposing surfaces, and wherein said micropores are designed and positioned such that said flow past said micropores generates a hydrostatic lifting force between said surfaces.

13. The device of claim 12, wherein said fluid is a liquid.

14. The device of claim 12, wherein said fluid is a gas.

15. The device of claim 12, wherein said opposing surfaces have a clearance ratio $\alpha$, and wherein said clearance ratio $\alpha$ is between 1.4 and 1.8.

16. The device of claim 12, wherein said opposing surfaces have a clearance ratio $\alpha$, and wherein said clearance ratio $\alpha$ is between 1.5 and 1.6.

17. The device of claim 12, wherein at least one of said opposing surfaces has a width ratio $\beta$ between about 0.2 to about 0.5.

18. The device of claim 12, wherein at least one of said opposing surfaces has a width ratio $\beta$ between about 0.3 to about 0.4.

19. The device of claim 12, wherein said at least one of said opposing surfaces contains a radially outward surface and a radially inward surface, and wherein said plurality of micropores is situated on said radially outward surface, said radially outward surface having a micropore coverage of between 15 area-% and 45 area-%.

20. The device of claim 12, wherein said opposing surfaces are nominally parallel.

21. The device of claim 12, wherein said pressure differential defines a higher pressure region and a lower pressure region, and wherein said micropores are disposed in said higher pressure region.

22. The device of claim 12, the seal having an effective gap width, and wherein said gap width substantially increases in a direction of a high pressure side of said opposing surfaces.

23. The device of claim 22, said plurality of micropores including micropores of varying characteristic depth, and wherein said micropores of varying characteristic depth are relatively positioned such that said characteristic depth increases in said direction of said high pressure side.

24. The device of claim 22, said plurality having a varying density, and wherein said micropores are positioned such that said density increases in said direction of said high pressure side.

25. A lubricated load-bearing device comprising:
    (a) a cylinder having an inner surface region, said inner surface region having a first surface;
    (b) a piston unit including a piston, said piston unit positioned inside said cylinder and having a radial surface region, said radial surface region having a second surface;
    (c) at least one plurality of micropores on a surface selected from the group consisting of said first surface, said second surface, and both said first surface and said second surface, and
    (d) a fluid situated between said first surface and said second surface,
wherein said micropores are designed and positioned such that said flow of said fluid past said micropores generates a lifting force between said first surface and said second surface, and wherein said first surface and said second surface are nominally parallel.

26. The device of claim 25, wherein said micropores are between about 3 microns and about 15 microns deep.

27. The device of claim 25, wherein said micropores are between about 5 microns and about 10 microns deep.

28. The device of claim 25, wherein said micropores cover between about 5 area-% and about 30 area-% of said surface.

29. The device of claim 25, wherein said micropores cover between about 10 area-% and about 20 area-% of said surface.

30. The device of claim 25, wherein said pore geometry of said plurality of micropores in one or more of said first and second surfaces is optimized for hydrodynamic load bearing conditions and for starved lubrication conditions.

31. The device of claim 25, wherein said piston unit further includes at least one piston ring, and wherein said second surface is a piston ring surface.

32. The device of claim 31, further including a piston surface having a plurality of micropores.

33. A lubricated hybrid seal comprising:
    (a) two surface regions having opposing surfaces;
    (b) at least one plurality of micropores in at least one of said opposing surfaces, each of said at least one plurality of micropores having a pore geometry; and
    (c) a fluid situated between said opposing surfaces,
wherein said fluid is induced to flow along said opposing surfaces by a relative movement of said opposing surfaces past said micropores and by an externally imposed radial pressure differential, and wherein said micropores are designed and positioned such that said flow past said micropores generates both a hydrostatic lifting force and a hydrodynamic lifting force between said opposing surfaces.

34. The device of claim 33, wherein said opposing surfaces are nominally parallel.

35. The device of claim 33, wherein said fluid is a liquid.

36. The device of claim 33, wherein said fluid is a gas.

37. The device of claim 33, wherein said opposing surfaces include a first surface having a plurality of micropores having a pore geometry optimized for hydrostatic lift, and a second surface having a plurality of micropores having a pore geometry optimized for hydrodynamic lift.

38. The device of claim 33, wherein one of said opposing surfaces includes a first plurality of micropores having a pore geometry optimized for hydrostatic lift and a second plurality of micropores having a pore geometry optimized for hydrodynamic lift.

39. The device of claim 33, wherein said pressure differential defines a higher pressure region and a lower pressure region, and wherein said micropores are disposed in said higher pressure region.

40. The device of claim 33, the seal having an effective gap width, and wherein said gap width substantially increases in a direction of a high pressure side of said opposing surfaces.

41. The device of claim 40, said plurality of micropores including micropores of varying characteristic depth, and wherein said micropores of varying characteristic depth are relatively positioned such that said characteristic depth increases in said direction of said high pressure side.

42. The device of claim 40, said plurality of micropores having a varying density, and wherein said micropores are positioned such that said density increases in said direction of said high pressure side.

* * * * *